July 29, 1947. E. O. WILLOUGHBY 2,424,598

ADJUSTABLE AERIAL

Filed April 11, 1944

Inventor
Eric Osborne Willoughby.
By
Robert Harding Jr.
Attorney

Patented July 29, 1947

2,424,598

UNITED STATES PATENT OFFICE 2,424,598

ADJUSTABLE AERIAL

Eric Osborne Willoughby, London, England, assignor, by mesne assignments, to International Standard Electric Corporation, New York, N. Y., a corporation of Delaware Application April 11, 1944, Serial No. 530,528
In Great Britain May 8, 1943

12 Claims. (Cl. 250—33)

The present invention relates to aerials for use over a broad frequency band and particularly to aerials which can be mechanically tuned, and are suitable for use on tanks, motor vehicles, motor boats and the like.

An object of the invention is to provide an aerial which can be tuned over a width of frequency band, for example, approximately 7 to 1 or 8 to 1 maximum to minimum frequency ratio and under about 20 metres in operating wavelength.

An adjustable aerial in accordance with this invention comprises a flexible conductor secured at one end to an insulating cord or the like, passing over a support, the free end of the conductor being wrapped around a rotatable conducting drum or the like to which is coupled a transmission line, and the free end of the cord or the like being wrapped around another drum or the like mechanically coupled to the first mentioned drum or the like so that as the conductor is wound up the cord or the like is unwound and vice versa.

Various other features and objects of the invention will be clear from the following description taken in conjunction with the accompanying drawings.

In the drawings—

Figure 1:
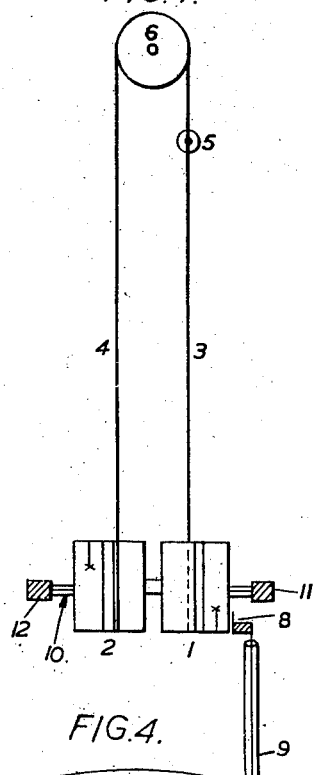
Figs. 1 and 2 are two diagrammatic views at right angles of one embodiment of the invention.
Figure 2:
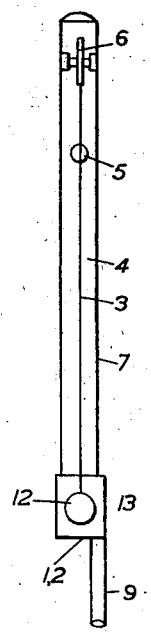

Referring to Figs. 1 and 2, the preferred embodiment of the invention comprises two drums 1 and 2 mounted on a shaft 10 in end bearings 11, 12 forming drum means. Both of the drums are metallic, or drum 1 is metallic and drum 2 non-metallic. These drums are mechanically connected so as to rotate together and cord 4 of insulating material is wrapped around drum 2, passed over suitable supporting means such as a pulley 6 located in the end of an insulating tubular supporting member 7 and is secured at its free end to one end of a flexible aerial conductor 3. The conductor 3 consists, for example, of finely braided metal and is wrapped around the metallic drum 1, that is the conducting portion of the drum means. The cord and conductor 3 are wrapped around their respective drums in such manner that when the drums are rotated the cord is wound up and the conductor is unwound and vice versa. Other arrangements for effecting this winding and unwinding of the cord and conductor are well known and require no further description. The conductor is provided with a non-corona termination shown in the present embodiment as a metallic ball 5 to which the cord may be attached. The ball 5 also assists in saving some aerial physical length on tuning to the longer wave length.

A wiper 8 makes contact with the metallic drum 1 and is connected to the end of a transmission line 9 which at its other end is connected or coupled to a translation device (transmitter or receiver).

The whole assembly carried by the dielectric tubular member 7, for example of paxolin or any flexible insulating material, may be arranged to swivel about the end 13 in any suitable manner to meet mechanical clearance problems, connection to the transmission line 9 being readily maintained as a flexible connection.

It is essential to keep the mechanical size of the drum 1 and the wiper 8 to the smallest possible dimensions, and arrange for any metal housing case to be at an appreciable distance to keep the capacity of the drum to earth at a low value. In practice, however, there is no difficulty in keeping the capacity of the drum to a suitable value. For example, any capacity below 10 mmf. (micro-microfarads) to earth is suitable for 150 megacycle operation. In achieving this low capacity of the drum to earth, it will generally be advisable to insulate it from the shaft 10.

One particularly convenient arrangement, for instance, is to use the aerial ¼ wave resonant connected to a 45 ohm transmission line, that is a transmission line whose characteristic impedance R is 45 ohms. The earth losses of the aerial system will increase the aerial resistance from 36 to approximately 45 ohms in an average case, mismatching not being serious in any case.

Figure 3:
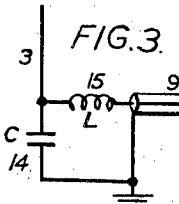
Fig. 3 is an explanatory diagram.

It is advisable, however, on the short wave end of the operating frequency band to adopt the simple expedient shown in Figure 3 to compensate for the shunt capacity to earth. In Figure 3, 15 is an inductance in series with the transmission line and 14 represents the capacity C of the drum to earth. The inductance L (15 of Figure 3) introduced in series between the central conductor of the transmission line and the wiper 8 is selected so that $$R=\sqrt{\frac{L}{C}}=45 \text{ ohms}$$

By this means, the effect of this shunt capacity of the drum to earth can be greatly reduced, and if this is done at the short wave end where its effect is most harmful, a very good overall performance over a wide frequency band can be achieved.

Figure 4:
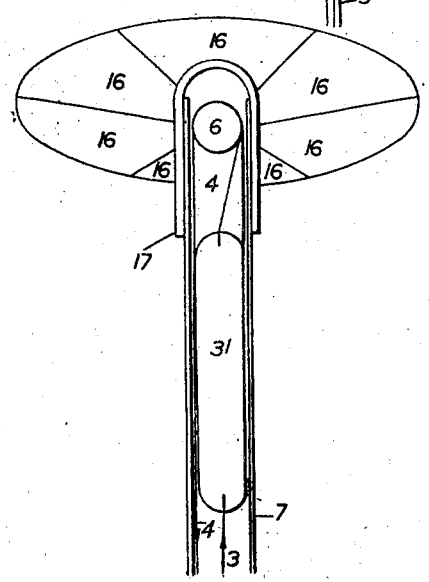
Figs. 4 and 5 show in section and perspective respectively, capacity loading arrangements for a purpose that will be made clear in the description.
Figure 5:
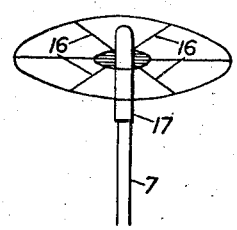

In the foregoing description the effective length of conductor 3 has been assumed to be ¼ wavelength at the longest wave operating frequency and the supporting tube 7 is consequently greater than this. It is, however, necessary to reduce this length to make the embodiment practical in most cases. The length of the supporting tube or mast 7 can be reduced to the order of from 0.12 to 0.20 operating wavelength. A suitable expedient for doing this is illustrated in Figure 4. In this embodiment 3' is a conductor, for example cylindrical or tubular, which is a little less than a ¼ wavelength long at the highest operating frequency, and hence when the drum 1 is wound to this operation condition, 3' forms the resonant aerial. The flexible conductor 3 is thin so as to maintain a high characteristic impedance of the aerial at long wavelengths, 3' then serving to form a top loading capacity. The amount of top capacity loading obtainable by this expedient alone, however, is not always adequate, and in such cases, the arrangement illustrated in Figures 4 and 5, is a suitable means of extending the operating wave band. In this case, a metal tubular cap 17 which can also serve to support the pulley 6, is provided over the end of the dielectric mast 7 as shown and this cap 17 has attached to it capacitively, as shown more clearly in Figure 5, a number of radial wires or rods 16 which form the main capacity loading. These rods are connected together at their outer and inner ends as shown and insulatingly supported from cap 17. The operation of the aerial on the longer wave end of the operating band is then as follows:

The cap 17 and rods 16 constitute a large capacity to earth of negligible radiation resistance. As 3' approaches this end, the capacity of the end of the aerial to earth increases until finally a maximum value of capacity loading from the end of the aerial to earth is obtained when 3' is within the metal cap 17 to the greatest amount. This means that after 3' commences to enter 17, the ratio of electrical length of the aerial to effective physical length is increased with increase of physical length for operation at longer wavelengths.

Whilst one particular type of capacity loading has been described, others well known in the art may be employed, for example, a metallic sphere mounted on the cap 17 may be used. Furthermore, other embodiments of the invention falling within the scope of the appended claims will occur to those skilled in the art.

What is claimed is:

1. An automatically loading and adjustable aerial including a flexible conductor, an insulating cord secured at one end thereof, a support over which said cord passes, a drum of conducting material, the free end of said conductor being wrapped around said drum, a transmission line coupled to said drum, a second drum around which the free end of said cord is wrapped, said second drum being mechanically coupled to said first mentioned drum, so that said conductor and said cord wind and unwind in opposite senses, also including a non-conducting tubular casing housing said conductor and cord, the loading means including an outer conducting tube over the upper end of said non-conducting tubular casing, and a conducting member of length just less than one quarter of the shortest operating wavelength required in the frequency band, secured between the end of said conductor and the end of said non-conducting cord, so as to form a variable capacity between said member and said outer conducting tube, as the former is drawn within the latter, and also including additional capacity loading means comprising a plurality of radiating metallic rods capacitively coupled to said outer conducting tube, so as to increase the ratio of electrical to physical length, of said aerial.

2. An adjustable aerial including a flexible conductor, and, secured at one end thereof, an insulating cord, a support over which said cord passes, a drum of conducting material, the free end of said conductor being wrapped around said drum, a transmission line coupled to said drum, a second drum around which the free end of said cord is wrapped, said second drum being mechanically coupled to said first mentioned drum, so that said conductor and said cord function in opposition as to winding up and unwinding, including a non-conducting tubular casing housing said conductor and cord, said loading means including an outer conducting tube over the upper end of said non-conducting tubular casing, and a conducting member of length just less than one quarter of the shortest operating wavelength required in the frequency band, secured between the end of said conductor and the end of said non-conducting cord, so as to form a variable capacity between said member and said outer conducting tube, as the former is drawn within the latter, and also including loading means comprising a plurality of radiating metallic rods capacitively coupled to said outer conducting tube and a circumferential metallic band connecting the outer ends of said radiating rods, whereby additional capacity loading is automatically secured when said aerial is adjusted to different frequencies, so as to increase the ratio of electrical to physical length, of said aerial.

3. An adjustable aerial including a flexible conductor, an insulating cord secured to one end thereof, a pulley support over which said cord passes, a drum of conducting material, the free end of said conductor being wrapped around said drum, a transmission line coupled to said drum so as to convey energy therebetween, a second drum around which the free end of said cord is wrapped, said second drum being mechanically coupled with said first-mentioned drum, so that as said conductor is wound up, said cord is unwound, and vice versa, and means responsive to the winding operation of the drum for increasing the ratio of electrical length to effective physical length of said conductor as said conductor is unwound from said drum.

4. An adjustable aerial including a flexible conductor, an insulating cord secured to one end thereof, a supporting means over which said cord passes, drum means including a conducting portion, the free end of said conductor being wrapped around said conducting portion, a transmission line coupled to said conducting portion so as to convey energy therebetween, the free end of said cord being wrapped around said drum means so that as said conductor is wound up, said cord is upwound, and vice versa, and means under control of the drum means and operable when the conductor is substantially fully extended for increasing the ratio of electrical length to effective physical length of said conductor as said conductor is unwound from or wound upon said means.

5. An adjustable aerial including a flexible conductor, an insulating cord secured to one end thereof, supporting means over which said cord passes, drum means having a conducting portion, the free end of said conductor being wrapped around said conducting portion, a transmission line coupled to said conducting portion so as to convey energy to said conductor, the free end of said cord being wrapped around said drum means so that as said conductor is wound up, said cord is unwound, and vice versa, and capacitive means operable with said conductor as it is unwound from or wound upon said conducting portion for changing the ratio of electrical length to effective physical length of said conductor.

6. An adjustable aerial including a flexible conductor, an insulating cord secured to one end thereof, supporting means over which said cord passes, drum means including a conducting portion, the free end of said conductor being wrapped around said conducting portion, a transmission line coupled to said conducting portion so as to convey energy therebetween, the free end of said cord being wrapped around said drum means so that as said conductor is wound up, said cord is unwound, and vice versa, and capacitive means operable with said conductor as it is unwound from or wound upon said conducting portion and when the conductor approaches full extension for increasing the ratio of electrical length to effective physical length of said conductor.

7. An adjustable aerial including a flexible conductor, an insulating cord secured to one end thereof, supporting means over which said cord passes, drum means including a conducting portion, the free end of said conductor being wrapped around said conducting portion, a transmission line coupled to said conducting portion so as to convey energy therebetween, the free end of said cord being wrapped around the drum means so that as said conductor is wound up, said cord is unwound and vice versa, and means for increasing the ratio of electrical length to effective physical length of said conductor as said conductor is unwound from said drum means which comprises means for capacity loading said aerial at longer wave lengths, and also including capacitive means for automatically bringing into circuit said loading means as said conductor is unwound.

8. An adjustable aerial including a flexible conductor, an insulating cord secured to one end thereof, supporting means over which said cord passes, drum means having a conducting portion, the free end of said conductor being wrapped around said conducting portion, a transmission line coupled to said conducting portion so as to convey energy to said conductor, the free end of said cord being wrapped around the drum means so that as said conductor is wound up, said cord is unwound and vice versa, and means for increasing the ratio of electrical length to effective physical length of said conductor as said conductor is unwound from said drum means which comprises means for capacity loading said aerial at longer wave lengths and a non-conducting tubular casing housing said conductor and cord, said loading means including an outer conducting tube over the end of said non-conducting tubular casing, and a conducting member of length just less than one quarter of the shortest operating wave length required in the frequency band, secured between the end of said conductor and the end of said insulating cord, so as to form a variable capacity between said member and said outer conducting tube, as the former is drawn within the latter.

9. An adjustable aerial including a flexible conductor, an insulating cord secured to one end thereof, supporting means over which said cord passes, drum means including a conducting portion, the free end of said conductor being wrapped around said conducting portion, a transmission line coupled to said conducting portion so as to convey energy therebetween, the free end of said cord being wrapped around the drum means so that as said conductor is wound up, said cord is unwound and vice versa, and means for increasing the ratio of electrical length to effective physical length of said conductor as said conductor is unwound from said drum means including a series inductance according to the formula $$R=\sqrt{\frac{L}{C}}$$

and so chosen that the shunt capacity, C, to earth of said conducting portion is compensated for at the high frequency end of the wave band by means of said series inductance L, R being the effective aerial resistance including losses, and means connecting said inductance between said conducting portion and said transmission line.

10. An adjustable aerial including a flexible conductor, means for supporting and extending said conductor comprising a rotatable conductor drum having wound thereon one end of said conductor, a non-conducting cord attached to the other end of said conductor with means for exerting tension thereon, and means controlled by the extending motion of the conductor for increasing the ratio of electrical length of the conductor to its effective physical length.

11. An aerial system adjustable over a wave band, comprising a flexible conductor, means for supporting and extending said conductor comprising a rotatable conductive drum having wound thereon one end of said conductor, a non-conducting cord attached to the other end of said conductor with means for exerting tension thereon, means controlled by the extending motion of the conductor for increasing the ratio of electrical length of the conductor to its effective physical length, a transmission line, means for coupling said line to the conductor end on said drum, said coupling means including devices for compensating for the drum to earth capacity at the high frequency end of the wave band.

12. An aerial system according to claim 11 wherein the compensating devices comprise a series inductance.

ERIC OSBORNE WILLOUGHBY.

REFERENCES CITED

The following references are of record in the file of this patent:

UNITED STATES PATENTS

| Number | Name | Date |
|---|---|---|
| 2,122,902 | Whistlecroft | July 5, 1938 |
| 1,438,290 | Beakes | Dec. 12, 1922 |
| 930,746 | Eisenstein | Aug. 10, 1909 |
| 1,962,202 | Meredith | June 12, 1934 |
| 1,296,687 | Nichols | Mar. 11, 1919 |

FOREIGN PATENTS

| Number | Country | Date |
|---|---|---|
| 404,091 | Great Britain | Jan. 11, 1934 |